May 25, 1926.

W. H. GLOCKER 1,585,851

METHOD AND APPARATUS FOR SURFACING PROPELLER BLADES

Filed Feb. 10, 1920 9 Sheets-Sheet 1

Fig.1.

Inventor
William H. Glocker
By
Edwards, Sager & Bower
Attorneys

May 25, 1926.

W. H. GLOCKER

1,585,851

METHOD AND APPARATUS FOR SURFACING PROPELLER BLADES

Filed Feb. 10. 1920 9 Sheets-Sheet 2

Inventor
William H. Glocker
By Edwards, Sager & Bower
his Attorneys

May 25, 1926.

W. H. GLOCKER 1,585,851

METHOD AND APPARATUS FOR SURFACING PROPELLER BLADES

Filed Feb. 10. 1920

Inventor
William H. Glocker
By his Attorneys
Edwards, Sager & Bower

May 25, 1926.

W. H. GLOCKER

METHOD AND APPARATUS FOR SURFACING PROPELLER BLADES

Filed Feb. 10, 1920 9 Sheets-Sheet 9

Inventor
William H. Glocker

By Edwards, Sager & Bower
his Attorneys

Patented May 25, 1926.

1,585,851

UNITED STATES PATENT OFFICE.

WILLIAM H. GLOCKER, OF PHILADELPHIA, PENNSYLVANIA, ASSIGNOR TO THE WILLIAM CRAMP & SONS SHIP & ENGINE BLDG. CO., A CORPORATION OF PENNSYLVANIA.

METHOD AND APPARATUS FOR SURFACING PROPELLER BLADES.

Application filed February 10, 1920. Serial No. 357,663.

This invention relates to the rotors of hydraulic apparatus such as propellers and particularly to a method and apparatus for accurately surfacing such rotor blades, thereby reducing the amount of labor and shaping the blade surfaces quickly and accurately.

Propellers to be efficient call for a very high degree of accuracy in the formation of their surfaces and the balance of their parts so that their center of gravity will coincide with the axis of the shaft. The blades of the same propeller must also be of exactly the same shape area and pitch to drive smoothly and evenly. It is impossible in practice to cast propellers, particularly of larger sizes, without such variation from accurate contour as to require extensive and careful reshaping and finishing. The propeller parts, therefore, must be cast sufficiently thicker than their final dimensions to allow for the removal of all dirt and dross as well as for the average inaccuracy of the casting. All of this excess thickness must be removed even from the most accurately cast propellers. This reshaping, as done originally by chipping and filing and later by attempts at planing these curved surfaces on regular planing machines, has formed a great and determinative item in the cost of the propeller and the time required to make it.

The driving surfaces of the blades in particular require a very smooth and accurate finish as they operate at high speed and against high fluid pressure and any roughness or inequality means inefficient and uneven operation.

Furthermore the speed with which the apparatus of this invention removes material makes it possible, when the very best and strongest propellers are required, to cast the propellers with their driving surfaces upward leaving a very liberal amount of finish where the dirt and dross will accumulate. The removal of this extra finish is done at very little additional cost by the process and apparatus of this invention which thus provides a propeller that is perfectly homogeneous and entirely free of dirt and dross.

In the accompanying drawings illustrating the process and apparatus of this invention.

According to the method of this invention the propeller or the propeller blades, when these are separate, are preferably cast with the driving surfaces of the blades uppermost so that in the complete casting these surfaces contain the impurities and flaws. At the same time ample thickness is allowed for the removal of a layer of the driving surface sufficient to remove these impurities and true the surface to accurate contour. After casting, the driving faces of the blades are machined to accurate contour by the apparatus of this invention which automatically feeds and cuts and follows the desired contour of propeller surface at every point of the blade. This formation of the driving surfaces cuts away the top surfacing with its impurities and roughness leaving a solid homogeneous metal in the blading precisely smooth and free from flaws. From this driving surface thus accurately formed the proper contour of the back surface is easily determined. The propeller blade is finished by surfacing this rear surface down to proper contour with relation to the front surface.

The method of this invention admits of completely finishing, without any hand work, the entire driving surface of a propeller by using a flat edged finishing cutter since at all parts of the surface the cutting edge of the tool is always in a line which generates the surface, a result which has not hitherto been attained. In attempting to machine a propeller on a planer for example, the cuts cannot be made with a flat tool since the angle of the helix changes from the tip to the hub and a series of radial steps are necessarily formed in face of the blade and these have to be removed by filing or scraping so that the final surfacing must be done by hand.

One embodiment of apparatus for thus machining propellers is shown in the drawings wherein 10 designates an L shaped base plate having a branch 11 with mechanism for supporting and rotating the propeller 12 and another branch 13 having mechanism for moving and feeding the cutting tool 14. Both of these mechanisms are driven from a single motor 15 of the reversing type driving gear 17 through pinion 16. The shaft 18 of gear 17 is mounted in bearings 19 and 20 and carries bevel gear 21, driving the tool mechanism, and spur gear 22 driving the propeller rotating mechanism. Bevel gear 21 engages bevel gear 23 of screw shaft 24 mounted in bearings 25, 26 and 27. The bearing 25 is carried by an arm 30 of the standard supporting the bearing 20 and bearings 26 and 27 are mounted on the ends of the frame 31 supporting the reciprocating carriage 32 for the cutting tool 14. Carriage 32 is provided with a threaded nut portion fitted to the thread of screw shaft 24 and the carriage slides on trackways 35.

Figure 6:
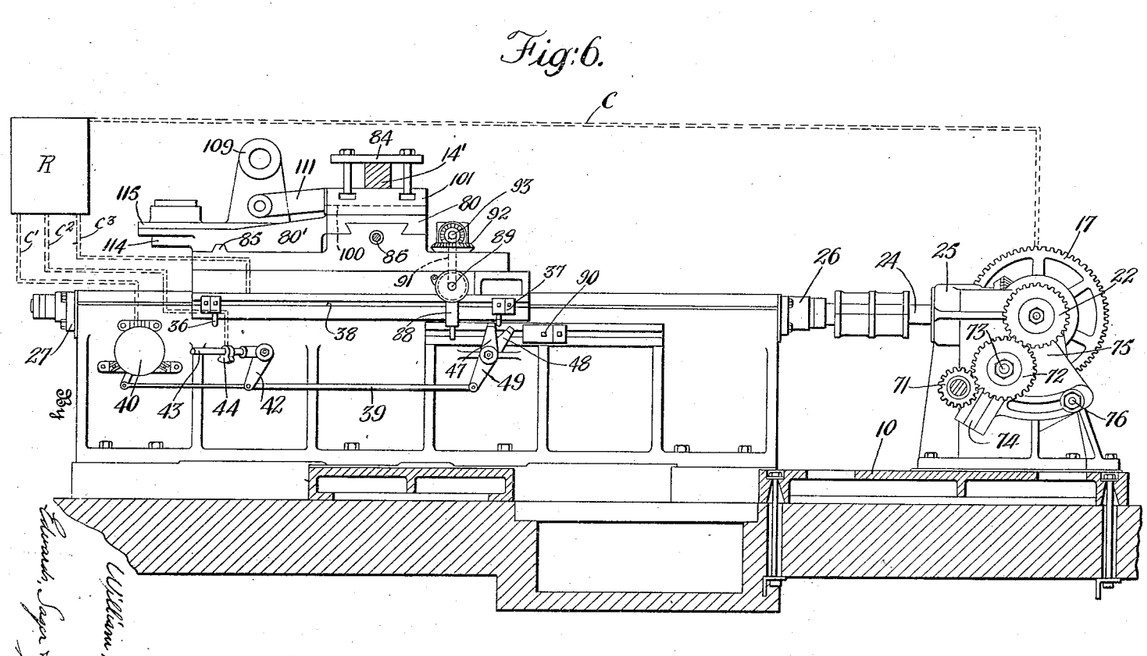
Fig. 6 is a sectional elevation on line 6—6 of Fig. 1.
Figure 7:
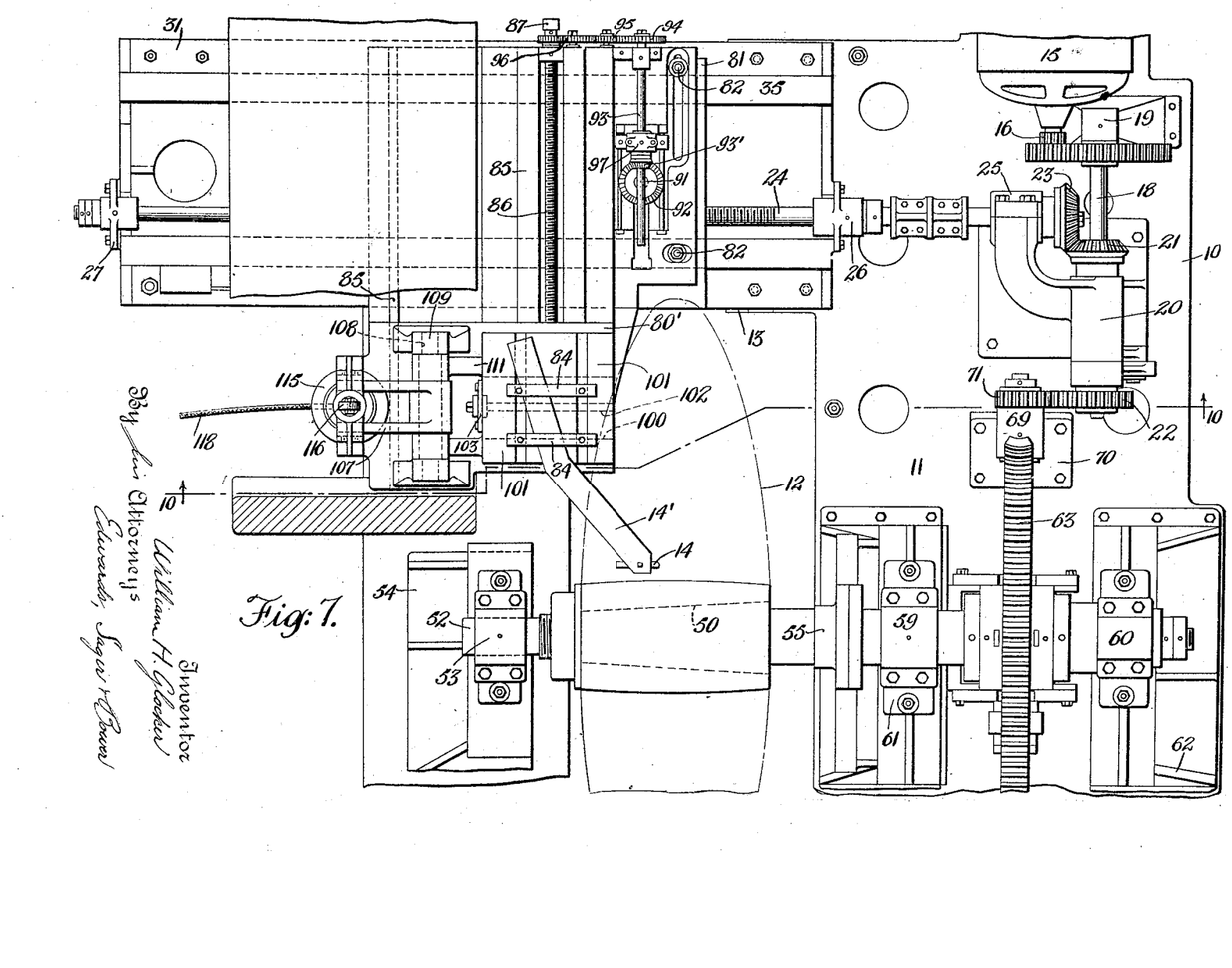
Fig. 7 is a general arrangement shown in plan view of the apparatus adapted for variable pitches or back surfacing.

The screw shaft 24 being driven by motor 15 rotation of this motor in one direction will move carrier 32 and its tool 14 outward on tracks 35 and the reverse direction of the motor will draw the carrier and tool inward. Automatic reverse means for the motor is provided in connection with the carrier 32 by adjustable dogs 36, 37 in slot 38 of the carrier, (Fig. 6). These dogs are brought by the reciprocation of the carrier into contact with arms 47 or 48 of lever 49 controlling motor reverse mechanism through rod 39, switch control box 40, reversing control box R and cable C. Auxiliary hand control of the reversing mechanism is provided by arm 42 and handle 43 and handle 43 may also be provided with switch mechanism 44 controlling the opening and closing of the motor circuit through control box R by turn of the handle 43 on its axis. When the driving motor is connected therefore the tool carriage 32 will be reciprocated back and forth on tracks 35 and the extent of its travel in each direction may be adjusted by the positions of dogs 36 and 37 in slot 38 so that the cutting tool will have a variable reciprocal motion substantially parallel to the axis of propeller 12. A second hand control 41 may also be provided to operate a switch 45 for moving the carrier 32, the switch 45 being also connected to the motor through control box R and automatically operated by stops 36 and 37 and connecting shaft 46.

Figure 5:
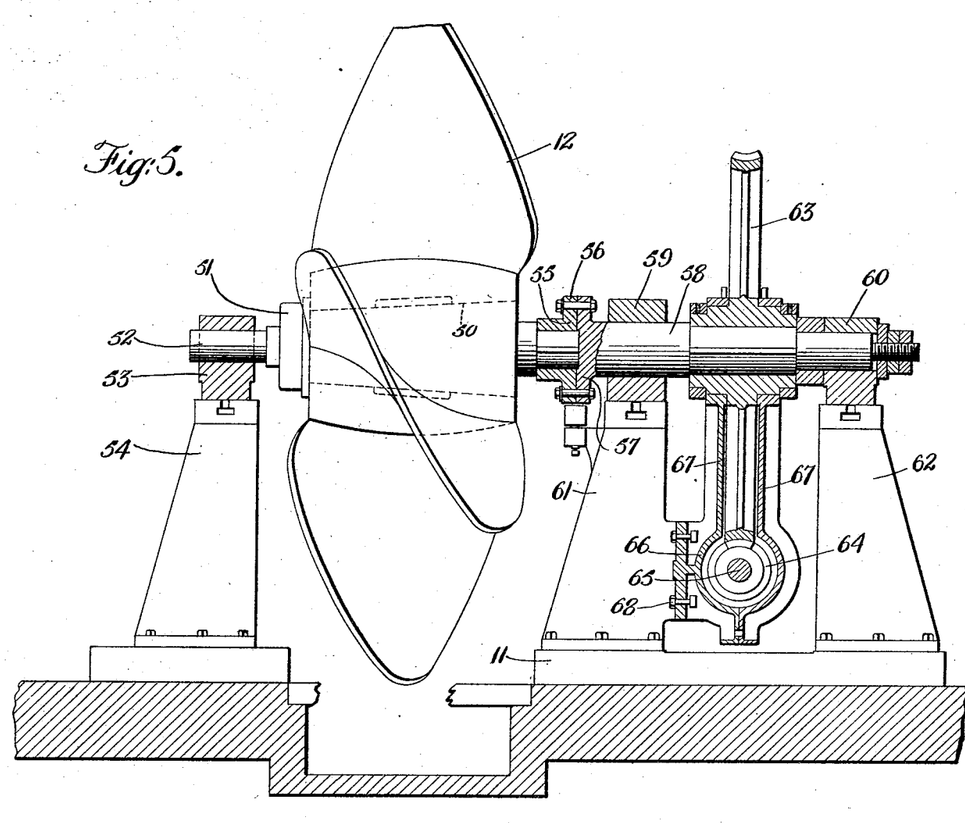
Fig. 5 is a sectional elevation on line 5—5 of Fig. 1.

In the embodiment of the invention shown in the drawings the driving surfaces of the propeller blades are to be helical so these blade surfaces must be turned in definite relation to the position and the movement of the cutting tool 14. The propeller 12 is mounted on a tapered portion of spindle 50 and held on said taper by nut 51 (Fig. 5). One end of the spindle 50 forms an extended journal 52 fitted in cap bearing 53 adjustably mounted on standard 54 located to suit conditions; the other end of the spindle 50 fits into a central recess of driving spindle 58 and has keyed on it a circular head 55 having a flange 56 registering with and bolted to chuck flange 57 of the driving spindle 58 running in bearings 59 and 60 carried adjustably on standards 61 and 62 of the base leg 11. Spindle 58 is driven by worm wheel 63 in turn driven by worm 64 of shaft 65. The worm end of this shaft is mounted in a thrust bearing bracket 66 having upwardly extending arms 67 with bearings fitted on the hub of worm wheel 63 and maintaining the worm and worm wheel in accurate driving engagement. Bracket 66 is adjustably mounted on standard 61 by T slot engagement therewith at 68. The driven end of shaft 65 runs in bearing 69 of standard 70 and is slidably keyed through gear 71 engaging with idler 72 which in turn meshes with driving gear 22 of shaft 18. Idler 72 is movably mounted on stud shaft 73 adjustably fixed in slot 74 of swinging frame 75 so that different sizes of gears 22 and 71 may be substituted to vary the relative diameters of gears 22 and 71 and consequently the relative movements of the tool and the propeller blade so that different pitches of driving surfaces may be machined.

Figure 1:
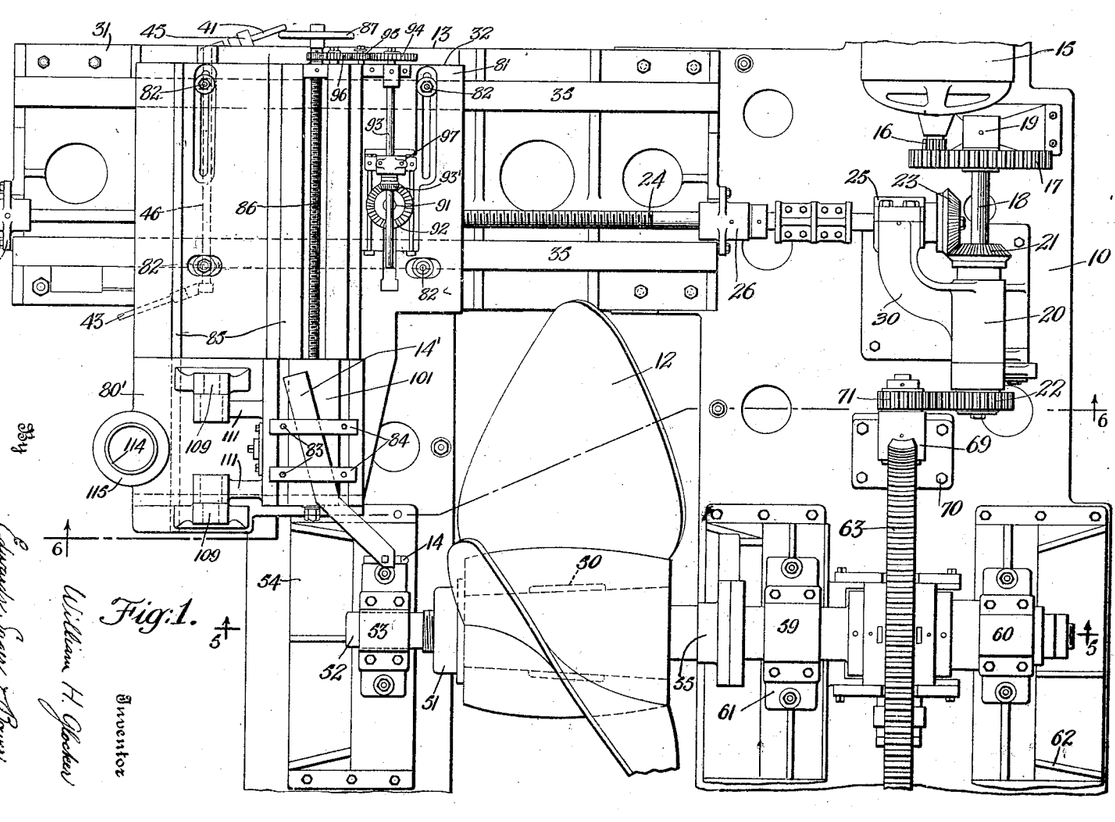
Fig. 1 is a plan view of one embodiment of truing and finishing apparatus adapted to operate on propeller blade driving surfaces.
Figures 2, 3:
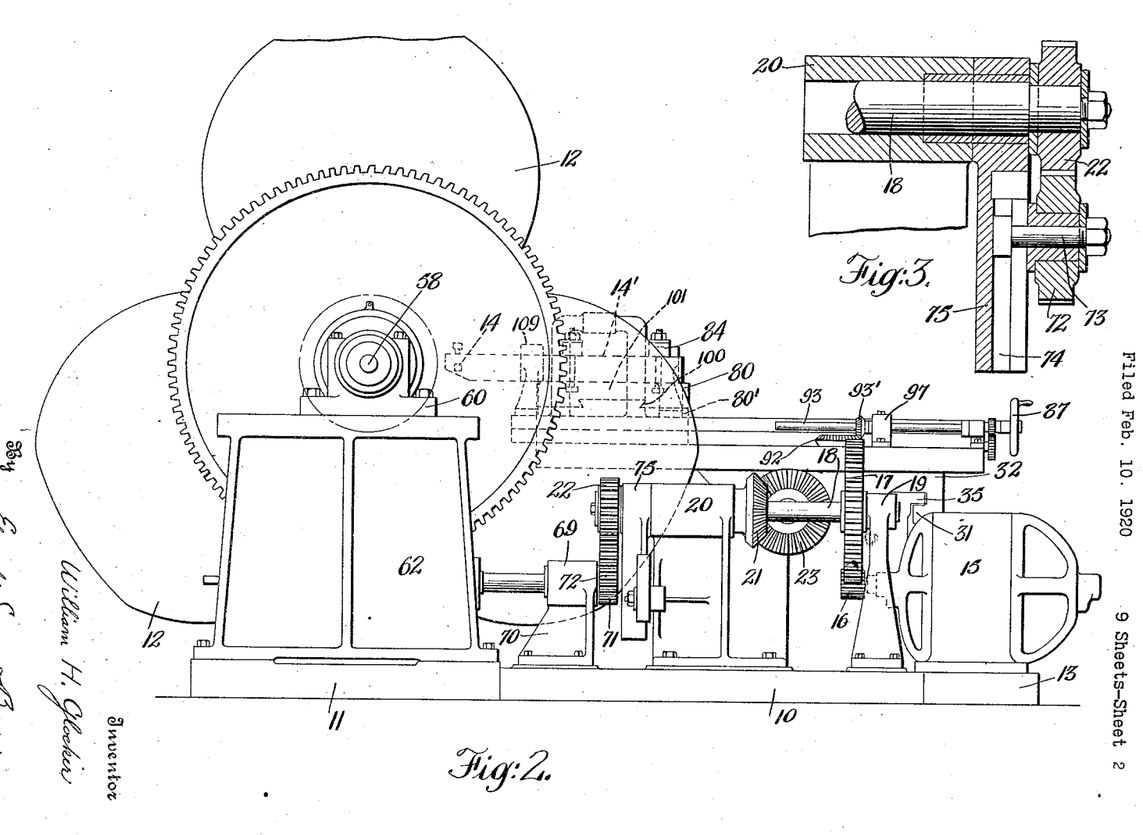
Fig. 2 is an end elevation of the same.
Fig. 3 is a sectional view of a detail.
Figure 4:
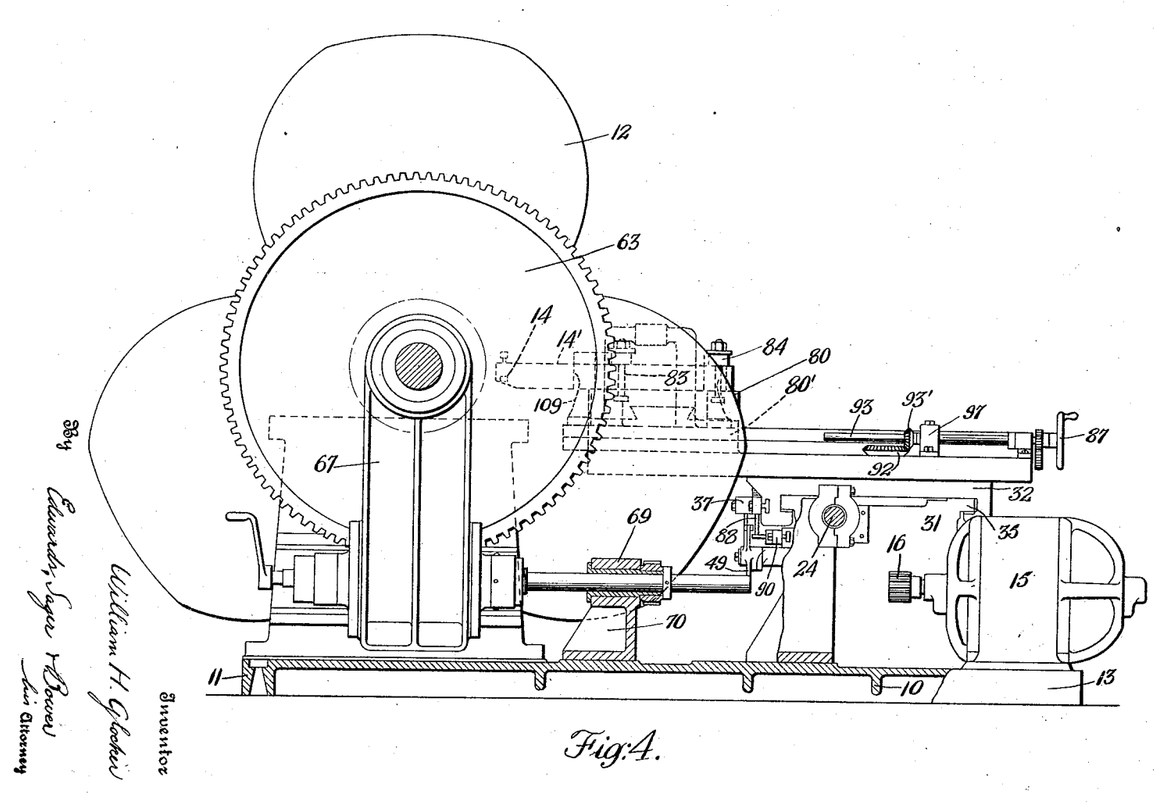
Fig. 4 is a view similar to Fig. 2 with parts in section.

The slide rest or support 81 for cross feed carriage 80 and tool 14 can be angled with relation to the carriage 32, and clamped by bolts 82 to admit of machining propellers whose blades set at any angle with relation to the axis of the bore. The tool holder 14' for tool 14 overhangs toward the work as shown and is clamped in place on cross carriage 80 by bolts 83 and bars 84, and the carriage 80 is moved along tracks 85 by screw shaft 86 rotated by hand wheel 87 or by an automatic gear drive actuated by the reciprocation of the carriage 32. A ratchet arm 88 (Fig. 6) is pivoted to shaft 89 on carriage 32 and is oscillated by engagement with adjustable stud 90 so that after each working stroke and just prior to the next the movement of the arm 88 turns shaft 89 forward. Shaft 89 is geared to vertical shaft 91 (Fig. 1) carrying bevel gear 92 which in turn drives the shaft 93 and gears 94, 95 and 96 the last of which is on the screw feed for the tool.

Bearings 53, 59 and 60 and the bearing bracket 65 with its worm and working shaft are adjustable toward and from the tool so as to position the axis of smaller propellers nearer thereto and vice versa. Similarly the support 81 is shiftable crosswise on the carriage 32 so that it may overhang more for larger propellers and vice versa. To accommodate the cross feed to this shifting of support 81 shaft 93 is slidingly keyed within its bevel pinion 93' sleeve held by bearing 97 rigid with carriage 32.

Figure 8:
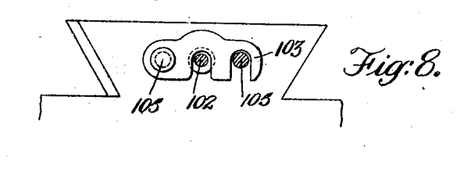
Figs. 8 and 9 are views of details.
Figure 9:
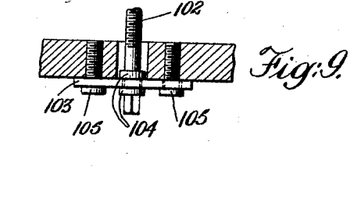

The cross feed carriage 80 is in two parts a main carriage 80' and an auxiliary slide 101 on ways 100 across the main carriage. Where the surfaces being finished are to be truly helical as with the driving surfaces of some propellers as hereinbefore described, slide 101 is rigidly clamped to the main cross carriage 80' by feed screw 102 threading through a projection on slide 101 and held against endwise movement by latch member 103 fitting between collars 104 on said screw and bolted to main cross carriage 80' by bolts 105 (see Figs. 8 and 9). With this latch in place as shown slide 101 is fastened to its carriage but may be shifted relatively thereto by turning feed screw 102 for instance to adjust the tool 14 to or from the work.

Where it is desired to machine other than truly helical surfaces the latch member 103 will be released and turned back out of engagement with screw 102 which will thus be freed and in turn will free the slide 101 for an auxiliary endwise movement on ways 100 across the cross carriage 80'.

Figure 10:
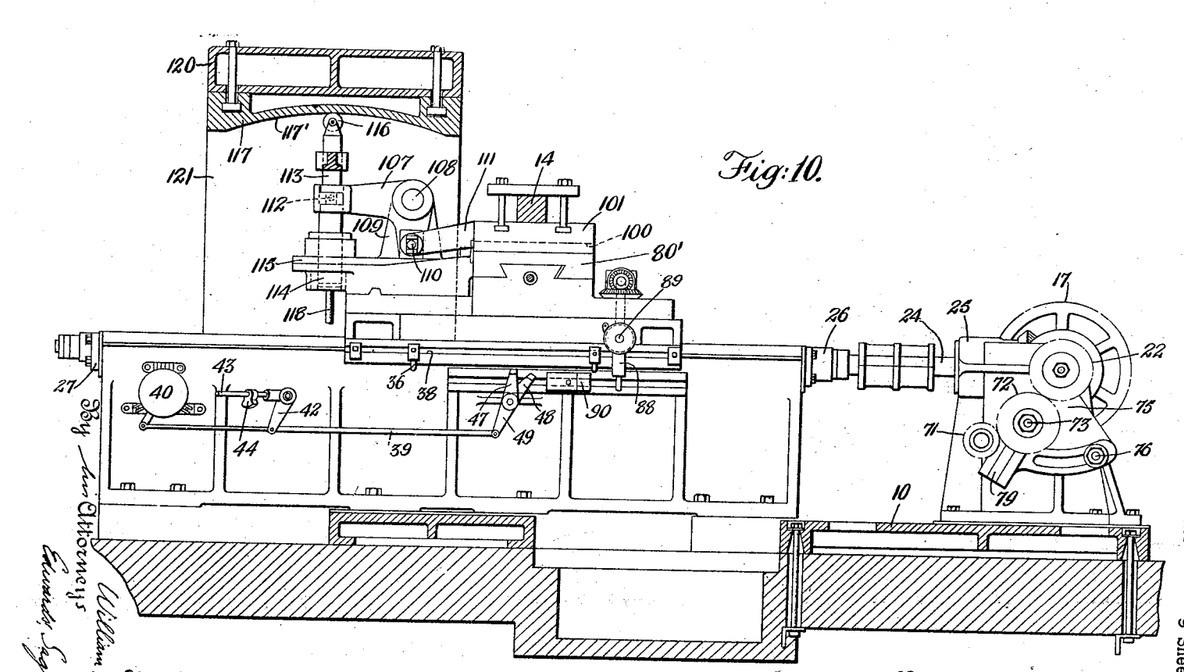
Fig. 10 is a sectional elevation on the line 10—10 of Fig. 7.

This auxiliary movement of the slide 101 and tool 14 is superposed upon the helical movement due to the movement of carriage 32 and permits the machine to finish driving surfaces of variable pitch and contour and also to finish the propeller back surfaces. The shifting of slide 101 on carriage 80' is controlled by a bell crank or bent lever 107 fulcrumed at 108 in standards 109 projecting upward from carriage 80'. One end of lever 107 carries journals 110 sliding in slots in extensions 111 of slide 101 and the other end of lever 107 is slotted and pivotally connected at 112 to a plunger 113 sliding vertically in cylinder 114 carried by extension 115 of carriage 80'. The upper end of the plunger carries a roller 116 held in contact with a former 117 by air pressure admitted into cylinder 114 through flexible tube 118 so that plunger 113 is yieldingly held upward under the substantially invariable pressure of the compressed air in the cylinder. The former 117 has its surface 117' shaped to give a desired auxiliary movement to slide 101 through the tipping of the lever 107 as roller 116 is moved across the former by movement of carriage 80'. The support for the former comprises a bridge member 120 supported by two legs 121 and the former is removably bolted thereto so as to be replaceable according to the work to be done. The former 117 shown in Figs. 7 to 11 has its surface 117' wide enough in the direction of the propeller axis to extend the full length of the longest stroke required of the carriage 80' and this surface extends crosswise a distance corresponding to the crossfeed from the tip to the hub of the propeller blade. In the particular embodiment shown the former surface 117' is concaved to adapt the auxiliary motion of slide 101 to the contour of the rear surface of the propeller blade. As the carriage 80' moves inward, to the right (Fig. 10), the concavity of former surface 117' will first retract slide 101 relatively to carriage 80' and then advance it so that the cutting stroke of the tool will first lag behind the corresponding helix and then accelerate to reapproach it. This will give a relative convexity to the surface being machined as is usual with propeller back surfaces and this convexity may become greater as the hub is approached by simply correspondingly varying the concavity of former surface 117'.

Figures 11, 12:
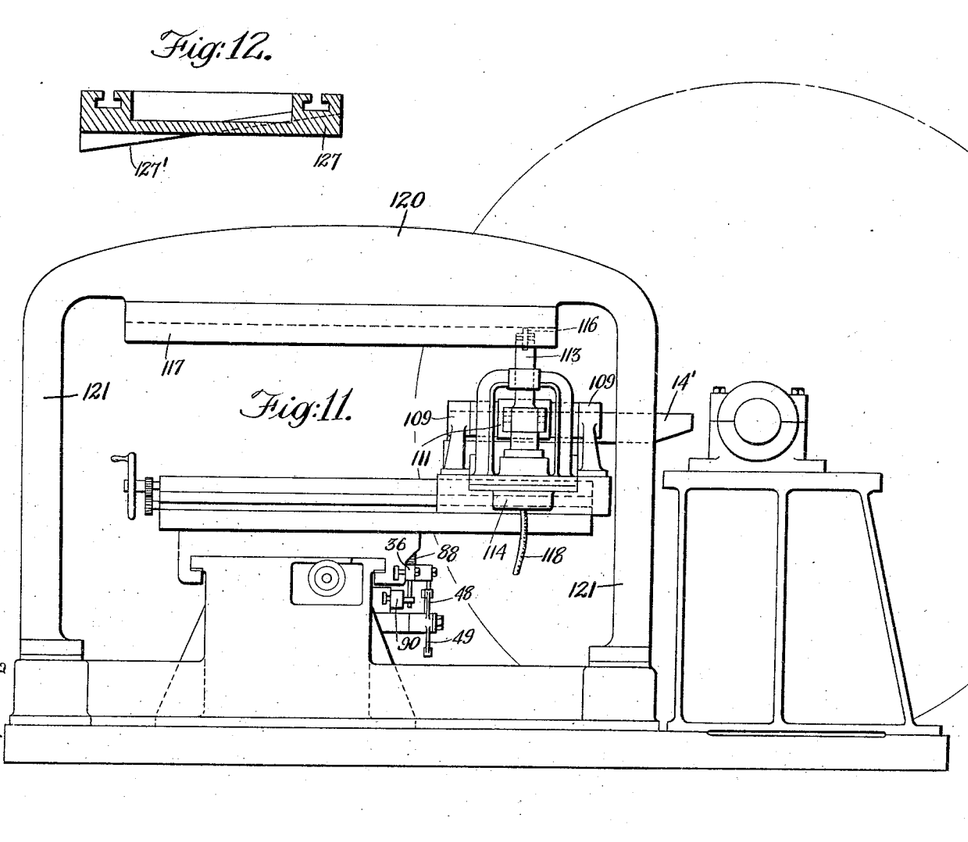
Fig. 11 is an end elevation of the apparatus as shown in Fig. 7.
Fig. 12 is a sectional view of a detail.

The type of former 127 shown in Fig. 12 has a surface 127' of substantially straight line elements of changing inclination so that while they move the auxiliary slide 101 at constant speed the rate of movement varies with the crosswise position of carriage 80'. This former 127 will therefore give a helical surface varying in pitch from the blade tip to the hub and is particularly adapted for some types of propeller driving surfaces.

In the operation of the apparatus the propeller is assembled on its spindle and the spindle positioned to be driven from shaft 58, the bearings 53, 59 and 60 of these parts having been adjusted to desirable distance from the tool carrier frame 31 and the proper gears 22 and 71 having been inserted to give the correct pitch ratio. The support 81 is then adjusted to give the necessary overhang and the desired angle of feed relative to the propeller axis, and handle 98 (Fig. 1) being turned to disconnect the automatic cross carriage feed, the hand wheel 87 is used to move the cross carriage 80 to starting position. The tool holder 14' is adjusted in its clamps and the tool 14 in its holder and the tool is put into position to give the desired depth of first cut by turning screw 102 moving auxiliary slide 101. Where the propeller blade surfaces are to be helical the auxiliary varying apparatus of Figs. 7, 8 and 9 will not be used and the tool slide 101 will be held rigid with the cross carriage 80' by latch member 103. Or where the blade surfaces are to be helical with varying pitch the auxiliary feed apparatus will be applied as shown in Figs. 7 to 12, the template or former surface of block 127 or 117 having been predetermined. All the clamps and bolts are then fastened and air pressure is admitted to hold plunger 113 and its roller 116 in contact with the surface of the former block. The automatic cross carriage feed is reconnected and the power turned on for the first or "roughing" cut beginning preferably at the tip of the blade and progressing inwardly toward the axis. The propeller blade is oscillated back and forth in front of the cutting tool 14 which is simultaneously reciprocated parallel to the propeller axis. Each cut, therefore, travels along the helical element of a cylindrical surface, the axis of the cylinder being substantially parallel to the axis of the propeller. Where the propeller is turned accurately on its own axis the axis of the cylinder will coincide with the propeller axis. The relative movement between the blade and carriage 80' on each stroke is truly helical and the resulting surface is truly helical with varying pitch if former 127 is used or may be concave or convex from helical or concave at one point and convex at another according to the template surface of the particular former used. When the rear surfaces of the propeller are to be machined the propeller will, of course, be reversed in position in the machine to present these rear surfaces to the cutting tool. The operation once started will continue automatically from the tip to the base of the blade and the removal of the driving surface layer is continued until the blade is down to the required thickness.

Figure 13:
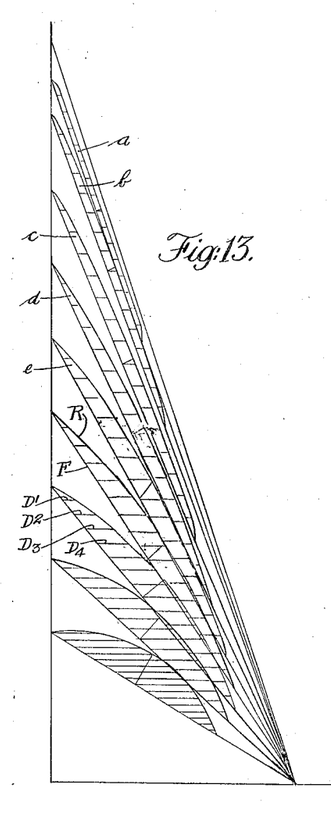
Figs. 13, 14 and 15 are diagrams of the template formation.
Figure 14:
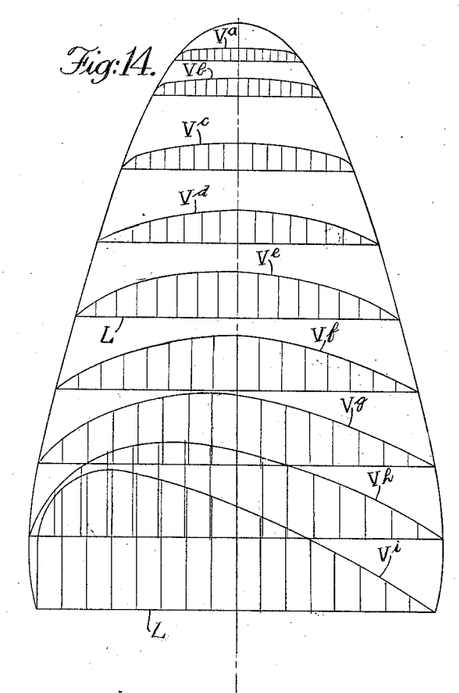
Figure 15:
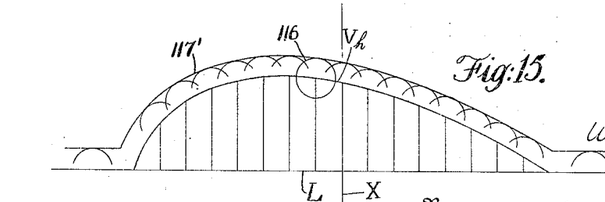

The determination of the contour of the template surface 117' for instance, may be accomplished graphically as illustrated in Figs. 13, 14 and 15. In Fig. 13 a number of desired sections $a$, $b$, $c$, $d$, etc., of a propeller blade are drawn at inclinations to a horizontal line representing the propeller axis, said inclinations corresponding to the angles of the helix with relation to the axis at different radii and in the example shown the propeller driving surface F is truly helical. The horizontal distances $D^1$, $D^2$, $D^3$, etc., from the front face F to the rear face R then represent the variation from a true helix which must be provided for by the auxiliary movement of the slide 101 with relation to the carriage 80' in order to properly machine the rear face of the blade. By laying off these distances from lines L Fig. 14 curves V may be drawn representing the variable movement of the slide 101 with relation to the carriage 80' at each section. Since the lengths of the arms of lever 107 are always relatively the same the horizontal movement of the slide 101 is identical with the simultaneous vertical movement of the plunger 113 and these lines V Fig. 15 may be taken as the centers of circles of diameter of the roller 116 to determine the corresponding necessary contour of the template surface 117 at each section. The lines L of Fig. 15 being positioned with relation to a vertical center line X in accordance with the corresponding positions of the sections on the center line of the propeller blade, the final contour lines 117' of Fig. 15 will also be relatively located in accurate relation crosswise and the entire template surface of the blade determined. Where as at $V^1$ Fig. 14 the curve has an excessively sharp portion which would mean great strains upon the mechanism it will be preferable to discontinue the machining of the surface and to finish these portions by hand.

The machine of this invention may be used to form both right hand and left hand propellers by simply adjusting the tool 14 with relation to the work and reversing the relative movement of the blade and tool carriage. For instance the machine shown in the drawings is particularly adapted for machining right hand propeller blades but a left hand propeller blade may be positioned on the spindle and the carriage 32 carried to move outward as the blade rotates downward, the tool 14 being arranged under the work. In small machine shops a single machine may thus serve for both right hand and left hand propellers and a single former may also be used for sets of similar twin screw right and left hand propellers. Where a large number of propellers are to be machined it is desirable to have separate right hand and left hand machines, the left hand machine being a duplicate of the right hand machine shown in the drawings as the latter would be reflected in a mirror. No adjustment of the mechanism for the two different types of propellers will then be necessary and the cutting tool will always be above the surface of the work and within easy view and access. The operation of the machine requires little attention and is substantially entirely automatic with all the precision and accuracy of machine work. At the same time the machine is readily adaptable to all types of surfaces met with in practice. In many cases where only a very small number of similar propellers are being made it may be preferable to dispense with the special machining of the backs of the blades and to finish these surfaces by hand. The surfacing by the process and apparatus of this invention is accurate and easily controlled, the tool cuts are in the same direction as the motion of the propeller surface through the water reducing resistance to a minimum and the final result is a more perfect product and at a greatly reduced cost.

While this invention has been described specifically in connection with the machining of propeller blading, it is obvious that such a machine may be applied to the blade of other hydraulic apparatus such as pumps or turbines.

I claim:

1. Apparatus for surfacing rotor blades comprising the combination with means for movably supporting a rotor blade on a fixed axis of means cutting said blade along lines extending from the blade tip to a point relatively close to the rotor axis and contained in a cylindrical surface coaxial with the rotor, and means for rotating the rotor.

2. Apparatus for surfacing rotor blades comprising the combination with means for movably supporting a rotor blade on a fixed axis of means cutting said blade along lines extending from the blade tip to a point relatively close to the rotor axis and contained in cylindrical surfaces having their axes parallel to the axis of the rotor, and means for rotating the rotor.

3. Apparatus for forming rotor blades comprising the combination with means for supporting a rotor blade, of means for oscillating said blade around a fixed axis, and means for moving a tool in contact with blade surfaces of said rotor from the blade tip to a point relatively close to the rotor axis.

4. Apparatus for surfacing rotor blades comprising the combination with means for movably supporting a rotor blade, of means for cutting said blade along lines extending from the blade tip to a point relatively close to the rotor axis and each cut being substantially wholly contained in a single substantially cylindrical surface coaxial with the rotor, and means for rotating the rotor.

5. Apparatus for surfacing rotor blades comprising the combination with means for movably supporting a rotor blade, of means for cutting said blade along lines extending from the blade tip to a point relatively close to the rotor axis and each line of cut being substantially wholly contained in any one of a plurality of substantially cylindrical surfaces having their axes parallel to the axis of the rotor, and means for rotating the rotor.

6. Apparatus for forming rotor blades comprising the combination with means for supporting a rotor blade, of means for oscillating said blade, and means for moving a tool in contact with blade surfaces of said rotor from the blade tip to a point relatively close to the rotor axis, and also for effecting a cut during one operation of the tool from edge to edge of the blade being cut.

7. The method of finishing a rotor blade surface comprising moving the rotor blade about a fixed axis and moving the tool so that the relative movement of the tool in cutting is in part a circular motion around the axis of the rotor and extends completely from edge to edge of the blade.

8. The method of machining a rotor blade comprising moving the blade with a rotary motion simultaneously cutting the surface of said blade with a linear motion in a line parallel to the axis of said rotary motion, and intermittently moving the location of said cutting across the face of said blade from the blade tip to a point relatively close to the rotor axis.

9. The method of machining a rotor blade comprising moving the blade with a rotary motion simultaneously cutting the surface of said blade with a linear motion in a line parallel to the axis of said rotary motion, and intermittently moving the location of said cutting across the face of said blade to vary its distance from the axis of rotation from the blade tip to a point relatively close to the rotor axis.

10. The method of surfacing a rotor blade comprising simultaneously moving the blade and cutting tool and cutting the surface of the blade from the blade tip to a point relatively close to the rotor axis by a flat edge parallel to the generating line of said surface.

11. The process of forming rotor blade surfaces comprising oscillating the rotor blade about a fixed axis and machining the surfaces from the blade tip to a point relatively close to the rotor axis with a tool having a relative motion in part circular and coaxial with the rotor.

12. Apparatus for forming a rotor blade comprising the combination with a blade support and a tool support, of means for simultaneously moving said supports so as to produce a movement between said supports that is in part relatively circular so that said tool has relative movement along the surface of said blade from edge to edge thereof.

13. Apparatus for forming a rotor blade comprising the combination with mechanism for rotating the rotor, of means for moving a tool in timed relation to said rotation from edge to edge of said blade.

14. Apparatus for forming a rotor blade comprising the combination with mechanism for rotating the rotor, of means for reciprocating a tool in timed relation to said rotation completely back and forth across said blade from edge to edge.

15. Apparatus for forming a rotor blade the combination with means for rotating said blade around its axis through an angle corresponding to the distance from edge to edge of the blade, of means for machining the surface of said blade during said rotation.

16. In apparatus for forming a rotor blade comprising the combination with a rotatable supporting arbor therefor, of a reciprocatory tool moving in definite relation to the movement of said arbor and passing from edge to edge of said blade at each reciprocation.

17. Apparatus for forming a rotor blade comprising the combination with an oscillatory supporting arbor therefor, of a reciprocatory tool moving in definite relation to the movement of said arbor and passing from edge to edge of said blade at each reciprocation.

18. In apparatus for forming a rotor blade the combination with a rotatable supporting arbor therefor, of a reciprocatory tool moving in definite relation to the movement of said supporting arbor and relatively movable during one cut from edge to edge of a rotor blade which is being cut, and means for varying said relation to suit different contours of blades.

19. Apparatus for forming a rotor blade comprising the combination with an oscillating support for said blade of a reciprocating support for the forming tool, feeding means intermittently moving the cutting stroke from the blade tip to a point relatively close to the rotor axis, and a single reversible prime mover for actuating said supports.

20. In apparatus for forming a rotor blade the combination with an oscillating support for said blade, of a reciprocating support for the forming tool, a single reversible prime mover for actuating said supports, and means for varying the relative movement of said supports to suit different contours of blades.

21. Apparatus for forming rotor blades comprising the combination with a worm driven spindle for oscillating said blade, of a tool support reciprocating in timed relation to the oscillation of said spindle thereby effecting a single cut from edge to edge of the blade which is being surfaced, and means for feeding said tool toward or from the axis of said spindle from the blade tip to a point relatively close to the rotor axis.

22. In apparatus for forming rotor blades the combination with a worm driven spindle for oscillating said blade, of a tool support reciprocating in timed relation to the oscillation of said spindle thereby effecting a single cut from edge to edge of the blade which is being surfaced and means for feeding said tool toward or from the axis of said spindle and at any angle to said axis.

23. Apparatus for forming a rotor blade comprising the combination with means for machining said blade along helical lines substantially coaxial to the rotor axis, of mechanism for relatively moving said means to vary its distance from said axis from the blade tip to a point relatively close to the rotor axis.

24. In apparatus for forming a rotor blade the combination with means for machining said blade along helical lines substantially coaxial to the rotor axis, of mechanism for relatively moving said means at any angle to the axis of said blade.

25. An apparatus for forming a rotor blade comprising an L shaped base, mechanism on one leg of said base for supporting and oscillating a rotor, and mechanism on the other leg of said base for reciprocating a tool in contact with the blade surface of said rotor and from edge to edge of said blade.

26. An apparatus for forming a rotor blade comprising an L shaped base, mechanism on one leg of said base for supporting and oscillating a rotor, mechanism on the other leg of said base for reciprocating a tool in contact with the blade surface of said rotor and from edge to edge of said blade, and a single reversible prime mover for said mechanism.

27. An apparatus for forming a rotor blade comprising an L shaped base, mechanism on one leg of said base for supporting and oscillating a rotor, mechanism on the other leg of said base for reciprocating a tool in contact with the blade surface of said rotor and from edge to edge of said blade, and single reversible driving means for said mechanism comprising a reversible motor, a main shaft driven thereby, and auxiliary shafts geared to said main shaft.

28. An apparatus for forming a rotor blade comprising an L shaped base, mechanism on one leg of said base for supporting and oscillating a rotor, mechanism on the other leg of said base for reciprocating a tool in contact with the blade surface of said rotor and from edge to edge of said blade and single reversible driving means for mechanism comprising a reversible motor, a main shaft driven thereby, auxiliary shafts geared to said main shaft, and a speed ratio gear change between said main shaft and one of said auxiliary shafts.

29. Apparatus for forming a rotor blade comprising the combination with means for rotating the rotor blade relatively to a fixed support, of means for simultaneously cutting said blade from edge to edge by movement of the tool relatively to said support along a line parallel to the rotor axis.

30. Apparatus for forming a rotor blade comprising the combination with means for rotating the rotor blade relatively to a fixed support, of means for simultaneously cutting said blade from edge to edge by movement of the tool relatively to said support along a line parallel to the rotor axis comprising a movable carriage.

31. In apparatus for forming a rotor blade the combination with means for rotating the rotor blade relatively to a fixed support, of means for simultaneously cutting said blade by movement of the tool relatively to said support along a line parallel to the rotor axis comprising a movable carriage and an auxiliary movable tool support mounted on said carriage and having a cutting movement different from the movement of said carriage.

32. In apparatus for forming rotor blades the combination with means for relatively rotating the blade and a cutting tool around the rotor axis as a center, of a reciprocatory carriage, auxiliary movable tool support mounted on said carriage, a former, and means for controlling the movemnt of said tool support by said former.

33. In apparatus for forming rotor blades the combination with means for rotatably supporting the rotor blade to give relative rotary cutting movement between the blade and cutting tool, of a former shaped in accordance with the desired form of the rotor blade, and means for controlling the movement of a cutting tool by said former.

34. Apparatus for forming rotor blades comprising the combination with means for relatively rotating the blade and cutting tool, of means for moving said cutting tool substantially parallel to the axis of said rotation, and means for feeding said tool in the plane of said axis from the blade tip to a point relatively close to the rotor axis.

35. In apparatus for forming rotor blades the combination with means for relatively rotating the blade and cutting tool, of means for moving said cutting tool substantially parallel to the axis of said rotation at relatively variable velocity and means for feeding said tool in a plane of said axis.

36. In apparatus for forming a rotor blade the combination with an oscillating support for the blade, of a movable tool support, a former, and means for controlling the movement of said tool support from said former in timed relation to said oscillations.

37. An apparatus for forming a rotor blade comprising means for movably supporting the blade upon its axis which is laterally fixed, a tool, means for effecting relative movement between the tool and blade, regulating means, and means for controlling relative movement between said tool and blade from said regulating means in timed relation to movement of said blade.

38. An apparatus for forming a rotor blade comprising means for movably supporting the blade upon its axis which is laterally fixed, a tool, means for effecting relative movement between the tool and blade in a direction substantially parallel to the rotor axis, regulating means, and means for controlling relative movement between said tool and blade from said regulating means in timed relation to movement of said blade.

39. An apparatus for forming a rotor blade comprising means for movably supporting the blade upon its axis which is laterally fixed while a cut is being made, a tool, means for effecting relative movement between the tool and blade, a former, means for controlling relative movement between said tool and blade from said former in timed relation to movement of said blade, and means for effecting relative radial movement between the tool and blade in addition to said other relative movement.

40. In apparatus for forming a rotor blade the combination with a support for the blade, of a tool support adapted to move in the general direction of the blade surface, and auxiliary controlling means automatically adjusting the movement of said tool support to the desired contour of blade surface at all points.

41. In apparatus for forming a rotor blade the combination with a rotatable support for the blade, of a tool support adapted to move the tool in a plane of the axis of said rotation and in the general direction of the blade surface and auxiliary controlling means automatically varying the movement of said tool support to the desired contour of blade surface at all points.

42. In apparatus for forming a rotor blade the combination with a rotatable support for the blade, of a tool support adapted to move the tool axially and to vary the distance from the axis in a plane through the axis of said rotation, and means controlling the axial movement of said tool to follow the desired contour of blade surface.

43. In apparatus for forming a rotor blade the combination with a support for the blade rotatable around the rotor axis, of a tool support adapted to move the tool axially and to vary the distance from said axis in a plane through the axis of said rotation, and means controlling the movement of said tool with relation to the axis to follow the desired contour of blade surface.

44. In apparatus for forming a rotor blade the combination with a support for the blade rotatable around the rotor axis, of a tool support adapted to move the tool axially and to vary the distance from said axis in a plane through the axis of said rotation, and means controlling both of said movements of said tool to follow the desired contour of blade surface.

45. The method of surfacing rotor blades comprising simultaneously moving the blade and surfacing means to produce a relative rotary motion between the blade and the surfacing means and moving said surfacing means axially along said blade thereby to effect a cut from edge to edge of the blade which is being surfaced from the blade tip to a point relatively close to the rotor axis.

46. The method of surfacing rotor blades comprising producing a relative rotary motion between the blade and the surfacing means and moving said surfacing means axially along said blade at a relatively variable velocity.

47. The method of surfacing rotor blades comprising producing a relative rotary motion between the blade and the surfacing means and simultaneously moving said surfacing means relatively to said blade in a direction parallel to the axis of rotation with a linear velocity bearing a constant ratio to the angular velocity of said rotary motion.

48. In apparatus for forming rotor blades the combination with means for producing relative helical movement between the blade and a tool support around the rotor axis as a center of means for giving said tool an auxiliary movement relatively to said helical movement.

49. In apparatus for forming rotor blades the combination with means for producing relative helical movement between the blade and a tool support around the rotor axis as a center of means for giving said tools a variable auxiliary movement relatively to said helical movement comprising a former.

50. In apparatus for forming rotor blades the combination with means for supporting the rotor blade for rotation around the rotor axis, of means for moving the tool relatively thereto comprising means for moving the tool with motion compounded of a positive generating movement and an auxiliary movement relative thereto controlled by a former of any desired arbitrary shape.

51. In apparatus for forming rotor blades the combination with means for supporting the rotor and moving the surface thereof along the cutting tool for the cutting stroke, of means for movably supporting the tool comprising means controlling the stroke of the tool to give desired shape to the rotor blade surface, said control means comprising a former.

52. In apparatus for forming rotor blades the combination with a former and a cutting tool, of means for controlling the tool from the former comprising a movable part held into yielding contact with said former by fluid pressure.

53. In a machine tool the combination with a member moved positively by a force closed mechanism, of fluid pressure means for maintaining the action of said mechanism.

54. In a machine tool means for moving a cutting tool relatively to the work in a motion compounded of two motions, said two motions being definitely related to each other by means of a train of mechanism, and fluid pressure means for maintaining the functioning of said train of mechanism.

55. In a machine tool, means for moving the cutting tool relatively to the work to be cut, comprising a mechanism, and a fluid pressure operated plunger maintaining the functioning of said mechanism.

56. In a machine tool, means for moving the cutting tool relatively to the work to be cut, comprising a mechanism, and a fluid pressure operated plunger cooperating with a former to maintain the functioning of said mechanism.

57. An apparatus for forming a side of a rotor blade comprising means for supporting the blade upon an axis which is laterally fixed, a tool, means for effecting relative cutting movement between the tool and blade, including means for variably controlling the rate of relative movement, whereby the blade surface may be given a predetermined contour.

58. An apparatus for forming a side of a rotor blade comprising means for supporting the blade upon an axis which is laterally fixed, a tool, means for effecting relative cutting movement between the tool and said side, including means for variably controlling the rate of relative movement automatically in accordance with the position of the tool relative to the blade.

59. An apparatus for forming an irregular surface on a rotor blade comprising means for supporting the blade upon an axis which is fixed against lateral movement, a tool and support therefor, means for imparting a predetermined rate of movement to said tool support, and means for variably controlling relative movement between the tool carried by its support and the blade while said tool support maintains its predetermined rate of movement.

60. An apparatus for forming an irregular surface on a rotor blade comprising means for supporting the blade upon an axis which is fixed against lateral movement, a tool and support therefor, means for imparting a predetermined rate of movement to said tool support, and means for variably controlling relative movement between the tool carried by its support and the blade while said supporting means maintains its predetermined rate of movement, including means for effecting said relative movement only in a direction parallel to the rotor axis.

61. An apparatus for forming rotor blades comprising means for movably supporting a blade upon its rotor axis which is laterally fixed, a tool, means for effecting relative movement therebetween, and means for variably controlling said movement, including means presenting an irregular surface and a follower member engageable therewith.

62. An apparatus for forming rotor blades comprising means for movably supporting a blade upon its rotor axis which is laterally fixed, a tool, means for effecting relative movement therebetween, means for variably controlling said movement, including means presenting an irregular surface and a follower member engageable therewith, and means for effecting additional relative movement between said tool and blade in a direction angularly disposed to the direction of the other movement, said follower being maintained in constant contact with said surface during said additional relative movement.

63. An apparatus for forming a rotor blade comprising means for supporting the blade, a tool, means for effecting a series of relative movements between the tool and blade for performing cutting action, and means for causing one of said relative movements automatically when a prior relative movement has been completed.

64. An apparatus for forming a rotor blade comprising means for supporting the blade, a tool, means for effecting a series of relative movements between the tool and blade for performing cutting action, means for variably controlling said relative movement, and means for causing one of said relative movements automatically when a prior relative movement has been completed.

65. An apparatus for forming a rotor blade comprising means for supporting the blade, a tool, means for effecting a series of relative movements between the tool and blade for angularly surfacing the blade, means for moving the blade in one direction during surfacing, and means for automatically reversing the blade movement upon a predetermined surfacing movement thereof.

66. An apparatus for forming a rotor blade comprising means for movably supporting the blade upon its rotor axis, a tool, means for imparting movement to the tool and to the blade whereby cutting action is produced, and means for moving said blade and tool in their reverse directions automatically in accordance with a predetermined cutting action.

67. An apparatus for forming a rotor blade comprising means for movably supporting the blade upon a rotor axis, a tool, means for effecting relative cutting movement between said tool and blade in one direction, and means for effecting additional relative movement between said tool and blade to effect a new cut, said additional movement being automatically operative in accordance with predetermined cutting action.

68. An apparatus for forming a rotor blade comprising means for movably supporting the blade upon a rotor axis, a tool, means for effecting relative cutting movement between said tool and blade in one direction, means for effecting additional relative movement between said tool and blade to effect a new cut, said additional movement being automatically operative in accordance with predetermined cutting action, and means for automatically reversing movement of said tool and blade when said predetermined cutting action has been effected.

69. In apparatus for forming rotor blades the combination with means for supporting the rotor and moving the surface thereof along the cutting tool for the cutting stroke, of means for movably supporting the tool comprising means controlling the stroke of the tool to give desired shape to the rotor blade surface, said control means comprising a former, said last mentioned means being so arranged that tool movement is effected in a direction angularly disposed to a plane which is normal to the propeller axis.

70. In apparatus for forming rotor blades the combination with means for supporting the rotor blade for rotation around the rotor axis, of means for moving the tool relatively thereto comprising means for moving the tool with motion compounded of a positive generating movement and an auxiliary movement relative thereto controlled by a former of any desired arbitrary shape, said latter means being so arranged that said auxiliary movement is effected in a direction angularly disposed to a plane which is normal to the propeller axis.

WILLIAM H. GLOCKER.